United States Patent
Latimer et al.

(10) Patent No.: US 12,145,601 B2
(45) Date of Patent: Nov. 19, 2024

(54) AUTOMATIC QUALIFICATION OF PAYLOAD FOR AUTONOMOUS VEHICLES

(71) Applicant: Waymo LLC, Mountain View, CA (US)

(72) Inventors: Craig Latimer, Lafayette, CA (US); Eric Kim, San Francisco, CA (US); David Smith, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 210 days.

(21) Appl. No.: 17/453,544

(22) Filed: Nov. 4, 2021

(65) Prior Publication Data
US 2023/0134200 A1    May 4, 2023

(51) Int. Cl.
*B60W 40/13*    (2012.01)
*B60W 60/00*    (2020.01)

(52) U.S. Cl.
CPC .......... *B60W 40/13* (2013.01); *B60W 60/001* (2020.02); *B60W 2040/1315* (2013.01);
(Continued)

(58) Field of Classification Search
CPC ............... B60W 40/13; B60W 60/001; B60W 2040/1315; B60W 2040/133;
(Continued)

(56) References Cited

U.S. PATENT DOCUMENTS 7,690,737 B2    4/2010    Lu
9,663,118 B1 *  5/2017    Palmer ................. G05D 1/0061
(Continued)

FOREIGN PATENT DOCUMENTS

CN        113561978        10/2021
DE    102019116951 A1       1/2020
(Continued)

OTHER PUBLICATIONS

R. Dey, S. Das and P. B. Vora, "Design and Trajectory Estimation of Dynamic Motion Model," 2018 International Conference on Advances in Computing, Communications and Informatics (ICACCI), Bangalore, India, 2018, pp. 1334-1340, doi: 10.1109/ICACCI.2018. 8554511. (Year: 2018).*
(Continued)

*Primary Examiner* — Russell Frejd
*Assistant Examiner* — Ellis B. Ramirez
(74) *Attorney, Agent, or Firm* — McDonnell Boehnen Hulbert & Berghoff LLP

(57) ABSTRACT

A vehicle operable to pull a trailer comprising a payload is provided, that includes a plurality of sensors configured to capture sensor data related to the vehicle, the trailer, or both, and a controller configured to (i) receive the sensor data from the plurality of sensors, (ii) determine, based on the sensor data, one or more parameters associated with the trailer, the payload, or both, (iii) update, based on an analysis of the one or more parameters, a confidence level associated with an operation of the vehicle with the trailer and the payload, and (iv) based on the confidence level, responsively execute an autonomous control strategy comprising one or more adjustments to the operation of the vehicle.

19 Claims, 9 Drawing Sheets

(52) U.S. Cl.
CPC .............. *B60W 2040/133* (2013.01); *B60W 2040/1338* (2013.01); *B60W 2300/14* (2013.01)

(58) Field of Classification Search
CPC ..... B60W 2040/1338; B60W 2300/14; B60W 2420/00; B60W 2420/52; B60D 1/36; G01S 17/931; G01S 17/894; G01S 7/497; G01S 17/89; G01S 17/86; G05D 1/0088; G01C 21/165
USPC .......................................... 701/124, 28, 514
See application file for complete search history.

(56) References Cited

U.S. PATENT DOCUMENTS

| | | |
|---|---|---|
| 10,414,318 B2 | 9/2019 | Valtanen |
| 10,895,492 B2 | 1/2021 | Hall |
| 10,906,583 B2 | 2/2021 | Li |
| 10,919,350 B2 | 2/2021 | Hall |
| 11,010,991 B2 | 5/2021 | Helms |
| 2005/0206225 A1 | 9/2005 | Offerle |
| 2013/0041524 A1* | 2/2013 | Brey .................... G07C 5/08 |
| 2013/0108402 A1* | 5/2013 | Herman ................ B60P 1/6427 |
| 2016/0334229 A1* | 11/2016 | Ross ..................... G08G 1/161 |
| 2018/0105172 A1* | 4/2018 | Gesch ................. G01G 19/086 |
| 2019/0056234 A1* | 2/2019 | Lin ...................... G05D 1/0088 |
| 2019/0178701 A1* | 6/2019 | Hall ....................... G01G 19/62 |
| 2019/0210418 A1* | 7/2019 | Hall ....................... B60D 1/245 |
| 2019/0225154 A1* | 7/2019 | Ionascu ................ G06F 18/256 |
| 2019/0243364 A1* | 8/2019 | Cohen ................... G06V 20/20 |
| 2021/0383318 A1* | 12/2021 | Patnaik ................. B60P 7/0861 |

FOREIGN PATENT DOCUMENTS

| | | |
|---|---|---|
| EP | 3670214 | 6/2020 |
| WO | 2021098974 A1 | 5/2021 |

OTHER PUBLICATIONS

European Patent Office, Extended European Search Report mailed on Mar. 16, 2023, issued in connection with European Patent Application No. 22205158.3, 8 pages.

Elgharbawy et al., "Adapative functional testing for autonomous trucks", International Journal of Transportation Science and Technology, 8:202-218 (2019).

* cited by examiner

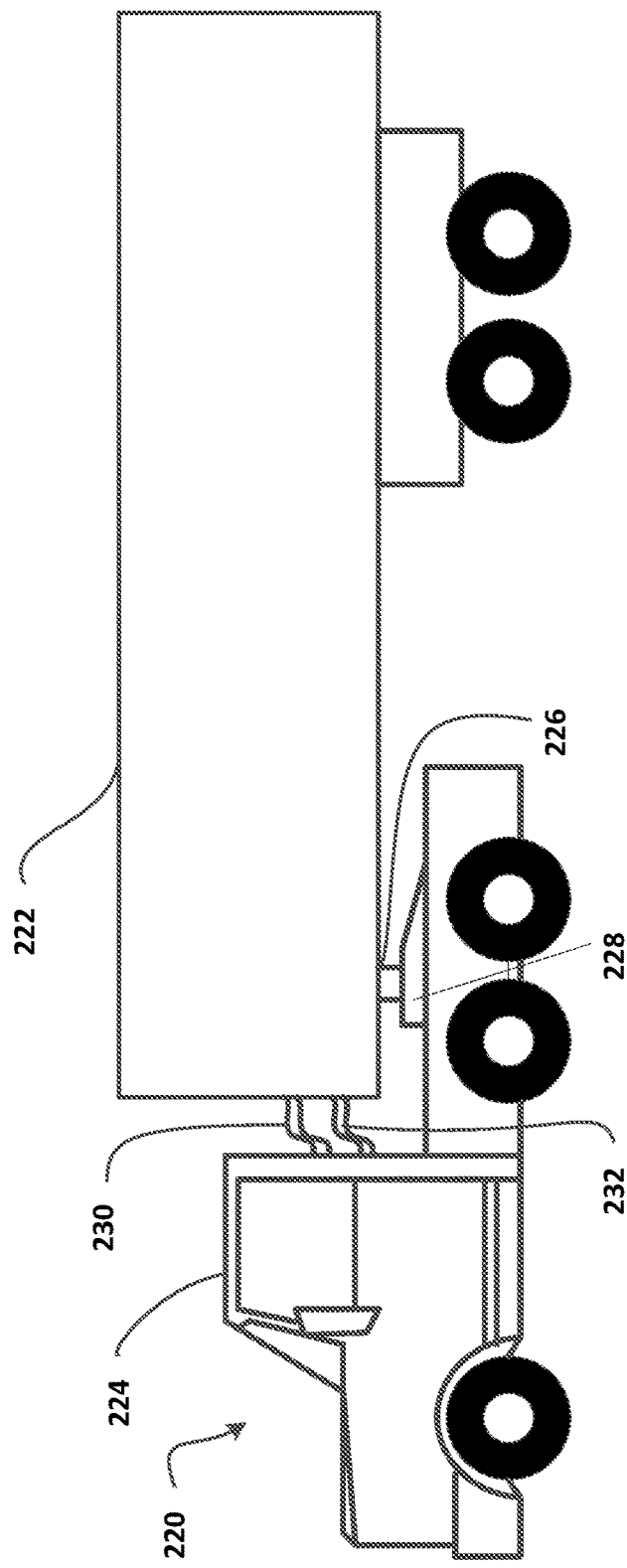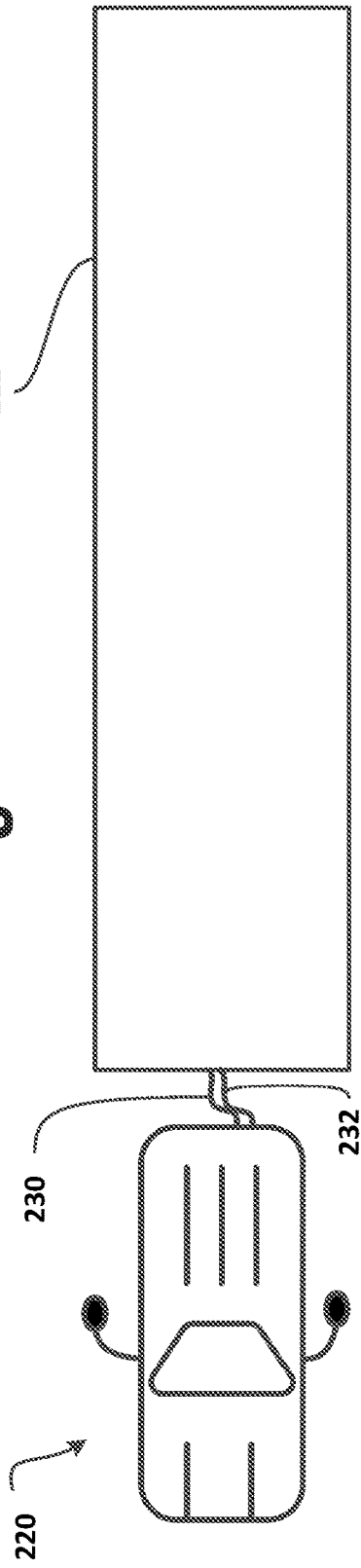
Figure 2B
Figure 2C

AUTOMATIC QUALIFICATION OF PAYLOAD FOR AUTONOMOUS VEHICLES

BACKGROUND

A vehicle may be equipped with a variety of sensors to facilitate safe operation of the vehicle in a surrounding environment. Example sensors may include position sensors (e.g., Global Positioning System, etc.), inertial sensors (e.g., gyroscopes, accelerometers, etc.), scanning sensors (e.g., LIDARs, RADARs, Cameras, etc.), among other types of sensors. An autonomous vehicle may be operable to pull one or more trailers that include respective payloads. Various parameters associated with the trailer and the payload may impact an operation of the autonomous vehicle. Real-time adjustments may need to be made to the operation of the autonomous vehicle based on data from the sensors.

SUMMARY

A vehicle may include a variety of sensors mounted at different locations on and/or inside the vehicle. Data from such sensors may be utilized to analyze a payload being pulled by the vehicle to build a confidence level that may be used when determining an autonomous control strategy for the vehicle. For example, when an autonomous vehicle, such as a truck, pulls a payload, there can be uncertainty related to an operation of the vehicle. For example, parameters such as a position, and/or configuration of a payload in a carrier (e.g., a trailer pulled by the autonomous vehicle) may not be known and/or may change during a movement of the vehicle, such as during acceleration, deceleration, braking, turning, reversing, and so forth. Accordingly, sensor data may be analyzed to reduce the uncertainty related to the parameters, and increase a confidence level of operating the vehicle. An autonomous control strategy for the vehicle pulling the payload may then be configured in accordance with the confidence level.

In a first example embodiment, a vehicle operable to pull a trailer comprising a payload is provided, wherein the vehicle includes a plurality of sensors configured to capture sensor data, related to the vehicle, the trailer, or both, and a controller configured to (i) receive the sensor data from the plurality of sensors, (ii) determine, based on the sensor data, one or more parameters associated with the trailer, the payload, or both, (iii) update, based on an analysis of the one or more parameters, a confidence level associated with an operation of the vehicle with the trailer and the payload, and (iv) based on the confidence level, responsively execute an autonomous control strategy comprising one or more adjustments to the operation of the vehicle.

In a second example embodiment, a method is provided that includes receiving, by a remote computing device, sensor data captured by a plurality of sensors of a vehicle that is operable to pull a trailer comprising a payload, wherein the sensor data relates to the vehicle, the trailer, or both. The method also includes determining, based on the sensor data, one or more parameters associated with the trailer, the payload, or both. The method further includes updating, based on an analysis of the one or more parameters, a confidence level associated with an operation of the vehicle with the trailer and the payload. The method additionally includes, based on the confidence level, causing the vehicle to responsively execute an autonomous control strategy comprising one or more adjustments to the operation of the vehicle.

In a third example embodiment, a method is provided that includes receiving, by a vehicle operable to pull a trailer comprising a payload, sensor data captured by a plurality of sensors of the vehicle, wherein the sensor data relates to the vehicle, the trailer, or both. The method also includes determining, based on the sensor data, one or more parameters associated with the trailer, the payload, or both. The method further includes updating, based on an analysis of the one or more parameters, a confidence level associated with an operation of the vehicle with the trailer and the payload. The method additionally includes, based on the confidence level, responsively executing an autonomous control strategy comprising one or more adjustments to the operation of the vehicle.

In a fourth example embodiment, a non-transitory computer readable storage medium is provided having stored thereon instructions that, when executed by a computing device, cause the computing device to perform operations. The operations include receiving, by a remote computing device, sensor data captured by a plurality of sensors of a vehicle that is operable to pull a trailer comprising a payload, wherein the sensor data relates to the vehicle, the trailer, or both. The operations also include determining, based on the sensor data, one or more parameters associated with the trailer, the payload, or both. The operations further include updating, based on an analysis of the one or more parameters, a confidence level associated with an operation of the vehicle with the trailer and the payload. The operations additionally include, based on the confidence level, causing the vehicle to responsively execute an autonomous control strategy comprising one or more adjustments to the operation of the vehicle.

In a fifth example embodiment, a non-transitory computer readable storage medium is provided having stored thereon instructions that, when executed by a computing device, cause the computing device to perform operations. The operations include receiving, by a remote computing device, sensor data captured by a plurality of sensors of a vehicle that is operable to pull a trailer comprising a payload, wherein the sensor data relates to the vehicle, the trailer, or both. The operations also include determining, based on the sensor data, one or more parameters associated with the trailer, the payload, or both. The operations further include updating, based on an analysis of the one or more parameters, a confidence level associated with an operation of the vehicle with the trailer and the payload. The operations additionally include, based on the confidence level, causing the vehicle to responsively execute an autonomous control strategy comprising one or more adjustments to the operation of the vehicle.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 2B illustrates an example tractor-trailer configuration, in accordance with example embodiments.

FIG. 2C illustrates an example tractor-trailer configuration, in accordance with example embodiments.

DETAILED DESCRIPTION

Figure 1:
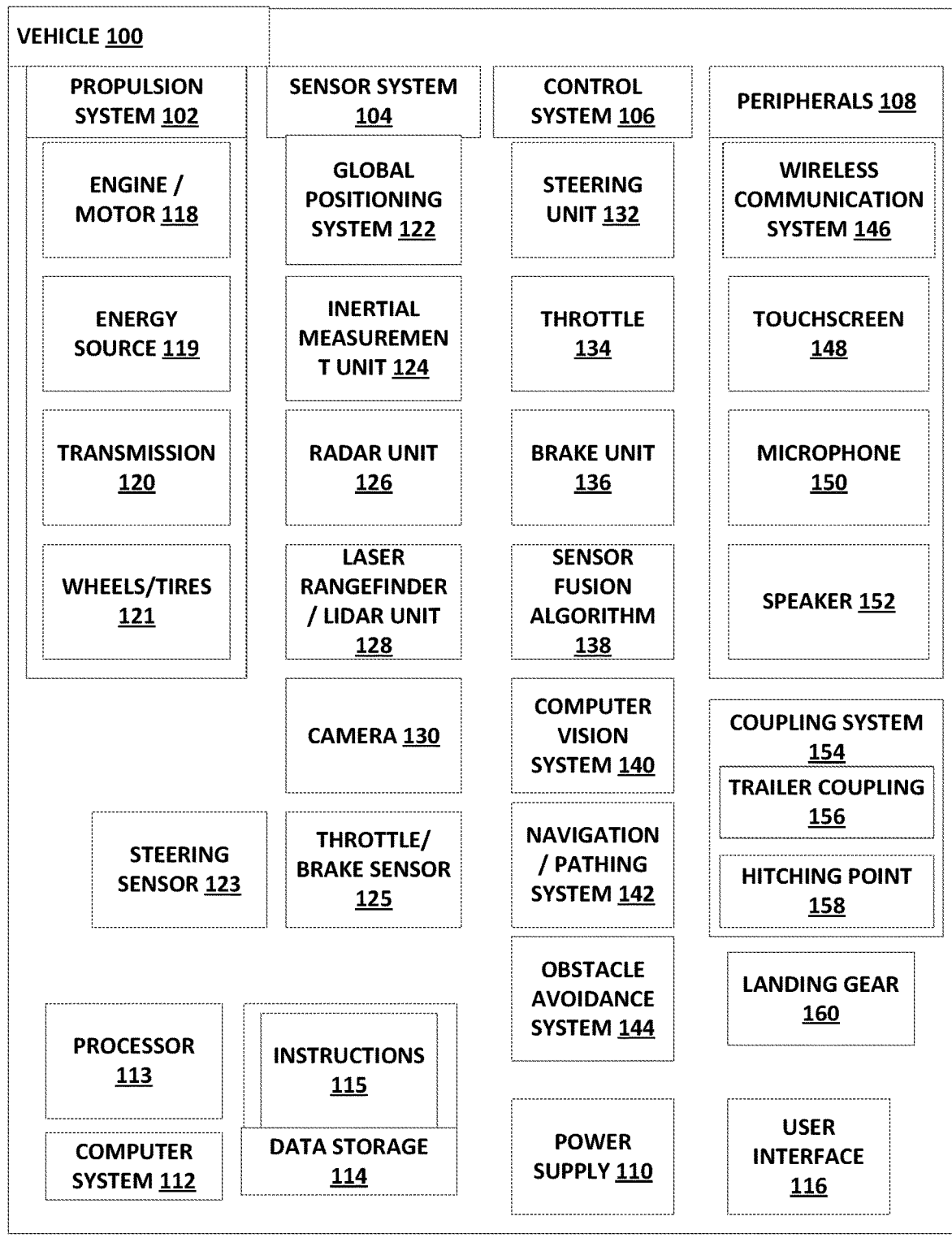
FIG. 1 illustrates a block diagram of a vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example." "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

The technology described herein relates to fully autonomous or semi-autonomous vehicles for transporting cargo, such as freight or livestock, between selected locations. The cargo may be transported using a towed or trailered arrangement. Driving from a warehouse or other point of origin to the destination may be performed in a fully or partially autonomous mode. Sensors can be used to measure various characteristics of a vehicle and/or a cargo, such as a configuration, weight, position, center of gravity (CG), and so forth. For example, sensors can provide inertial measurements, laser measurements for trailer articulation and body roll, pressure sensors on suspension (that check responses of a trailer suspension). Also, for example, the pressure sensors on the suspension may determine that a payload is laterally balanced, and that a lateral component of a payload CG is on the x-axis of the trailer. However, it may be more challenging to determine vertical and longitudinal components of the payload CG from such pressure sensor data. Accordingly, maneuvers may be needed to determine the additional components of the CG.

Sensor measurements may be used to determine a confidence level of the vehicle pulling the trailer, and the confidence level can then be used to formulate an autonomous driving strategy (e.g., navigation strategy, speed, acceleration, turn angles, and so forth) for the vehicle. A confidence level indicates a level of confidence with which a vehicle can pull the trailer with the payload. In some embodiments, an initial confidence level can be determined after a trailer with a payload is hitched to a vehicle, but before the vehicle is driven. Subsequently, the vehicle can be operated to perform one or more maneuvers, such as forward and reverse motion without turns, accelerating and decelerating without turns, performing various turns, and so forth, and the initial confidence level can be updated based on these maneuvers. In some embodiments, the maneuvers may be designed so as to achieve a threshold level of information content within a threshold of amount of time. The updated confidence level can then be used to determine a driving strategy for the vehicle. Additional factors such as road and weather conditions on segments of the planned route can be factored in to determine the confidence level. Also, for example, the confidence level can be updated in real-time as the vehicle is driven on the planned route.

In some aspects, a central system can store information related to a plurality of trailers, combinations of vehicles and trailers, trailers with or without payloads, and so forth. Such information can then be used to determine an optimal payload for a vehicle and/or trailer, a maintenance schedule for a trailer, etc. In some embodiments, the central system can be used to monitor trailers, receive sensor data from vehicles, and send instructions to the vehicles to adjust one or more operating parameters.

Existing technology for estimating a center of gravity for a load and given properties of a trailer, and adjusting driving behavior based on such parameters, are not adequate as they rely on known or discernible properties of a payload. Although there are rules and regulations that govern payloads, such rules relate to a per-axle load, and longitudinal load distribution. Generally, existing technology is directed to supporting a human driver of a vehicle, for example, to conform to the various laws and regulations. In some aspects, existing technology may involve use of in-trailer technology, such as, for example, an in-trailer radar, an in-trailer LIDAR, in-trailer ultrasonics, and/or an in-trailer camera used to visually inspect the payload. But such systems may not provide an automatic estimation of key payload parameters.

A carrier company generally does not know about the characteristics of a payload, and may exercise little to no control over the payload configuration, beyond that the payload is configured to be physically fitted in a given trailer. There may be uncertainty about a payload's mass related properties when hitching a trailer carrying the payload to an autonomous vehicle. Unknown factors such as trailer performance, payload size, and arrangement (e.g., center of gravity), trailer alignment relative to the vehicle (e.g., tilt, position), and other factors that can change during navigation, may impact the performance of the autonomous vehicle. Safety is of high importance, and is typically manually managed by a truck driver who can make adjustments in real-time during non-autonomous driving. An ability to precisely quantify whether a trailer-payload combination is within operating constraints of a vehicle is therefore of high significance. Accordingly, there is a need for metrics that a system may utilize to make decisions to guide an autonomous vehicle. In particular, there is a need to dynamically learn information about a trailer-payload combination based on sensor data, reduce uncertainty in parameters that may be unknown, increase a confidence level of operating the vehicle, and responsively adapt a driving strategy based on the updated confidence level.

II. EXAMPLE VEHICLE SYSTEMS

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. In some example embodiments, the vehicle may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles.

By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

Referring now to the figures, FIG. 1 is a functional block diagram illustrating example vehicle 100, which may be configured to operate fully or partially in an autonomous mode. In some examples, vehicle 100 may operate in an autonomous mode by receiving and/or generating control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber. Some or all of the wheels/tires 121 may be coupled to the transmission 120, and the computer system 112 may be able to receive information about tire pressure, balance and other factors that may impact driving in an autonomous mode.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth.

IMU 124 may have a configuration that uses one or more accelerometers and/or gyroscopes and may sense position and orientation changes of vehicle 100 based on inertial acceleration. For example, IMU 124 may detect a pitch, roll, and/or yaw of the vehicle 100 while vehicle 100 is stationary or in motion. In some embodiments, IMU 124 may include a register that records data from IMU 124 (e.g., an accelerometer), such as the position and orientation changes of vehicle 100 based on inertial acceleration. One or more accelerometers may sense changes in vehicular acceleration, and record each change in a register. The register may make sensor data available to control system 106 and/or computer system 112. Sensor data may then be processed, for example, by utilizing a sensor fusion algorithm 138.

In some embodiments, IMU 124 may be sensitive to environmental conditions such as temperature, altitude, barometric pressure, and so forth.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). In some examples, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. For example, if the vehicle 100 is configured for use on a road, such as a tractor-trailer truck or a construction vehicle, the steering unit 132 may include components to control the angle of wheels of the tractor unit to turn the vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. In some aspects, navigation/pathing system 142 may store map information (e.g., highly detailed maps that can be used for navigation). For example, the maps may identify the shape and elevation of roadways, lane markers, intersections, speed limits, cross-walks, merging lanes, road banks, grades, traffic signal devices, buildings, signs, vegetation, real-time traffic information, and so forth. Obstacle avoidance system 144 may evaluate potential obstacles based on sensor data and cause systems of vehicle 100 to avoid or otherwise negotiate the potential obstacles.

As shown in FIG. 1, vehicle 100 may also include a coupling system 154 for connectivity between the vehicle and the trailer (e.g., a tractor unit and an associated trailer). The coupling system 154 may include a trailer coupling 156 at the tractor unit and a hitching point 158 at the trailer. The coupling system 154 may provide pneumatic, power, communication, and/or other connections between the tractor unit and the trailer of the vehicle 100.

When a trailer is connected to a tractor unit, it may be beneficial for the tractor unit to know the current orientation and position of the trailer. In some embodiments, such information may be received using sensors including Lidar, radar, cameras, sonar, etc., mounted on the tractor unit. In some embodiments, the information may be received directly from the trailer coupling 156, and/or hitching point 158. For example, a magnetic encoder system may be employed on the trailer coupling 156, and/or hitching point 158 to provide information regarding the relative alignment between the tractor unit and the trailer.

In some embodiments, the trailer coupling 156 may include one or more read heads configured to obtain rotational information from a magnetic encoder ring of the hitching point 158 and to provide the obtained rotational information to the control system 106 in order to determine a relative alignment of the trailer to the tractor unit.

The hitching point 158 may include one or more air conduits and an electrical conduit disposed therein. The first end of the hitching point 158 may include one or more connectors respectively coupled to the one or more air conduits and an electrical connector coupled to the electrical conduit. The second end of the hitching point 158 may include one or more openings corresponding to the air conduits, the one or more openings being arranged to receive air pressure from the tractor unit and supply the air pressure to the brake unit 136 via the air conduits. The second end of the hitching point 158 may include an electrical contact interface configured for operative communication with an electrical connection section of the trailer coupling 156 to provide signals to the control system 106 via the electrical conduit for operation in the autonomous driving mode.

In some embodiments, where vehicle 100 is a tractor-trailer truck, vehicle 100 may include a set of landing gear 160. The landing gear 160 may provide a support structure for the trailer when decoupled from the tractor unit. The coupling system 154 provides connectivity between the trailer and the tractor unit. In some embodiments, the coupling system 154 may include a connection section to provide backward compatibility with legacy trailer units that may or may not be capable of operating in an autonomous mode.

In some embodiments, sensor fusion algorithm 138 of vehicle 100 may include a trailer tracking algorithm that utilizes sensor system 104, and may be implemented by processor 113 of computer system 112. In some aspects, Lidar sensor data may be received from one or more Lidar sensors mounted on a roof of vehicle 100, and/or other locations along a tractor-trailer arrangement. The trailer tracking algorithm may involve estimating an orientation of the trailer relative to the tractor based on the Lidar sensor data. Based on this data, the pose of the trailer may be derived in view of the orientation and other data about the trailer. For example, the length and height of the trailer, the position of the hitching point (e.g., hitching point 158) and the position of the trailer coupling (e.g., trailer coupling 156) may be taken into consideration.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIG-BEER, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Also, for example, computer system 112 may utilize input from sensor system 104 (e.g., one or more accelerometers in IMU 124) in order to estimate mass properties for a payload to build a confidence level that can be used to determine navigation strategy by vehicle 100 pulling the payload. For example, computer system 112 may make a determination about various objects based on a change in acceleration in conjunction with timing data obtained from the lasers or other optical sensors configured to sense objects in a field of view of vehicle 100. The various objects may be in a field of view of vehicle 100, and/or objects comprising the payload.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2A:
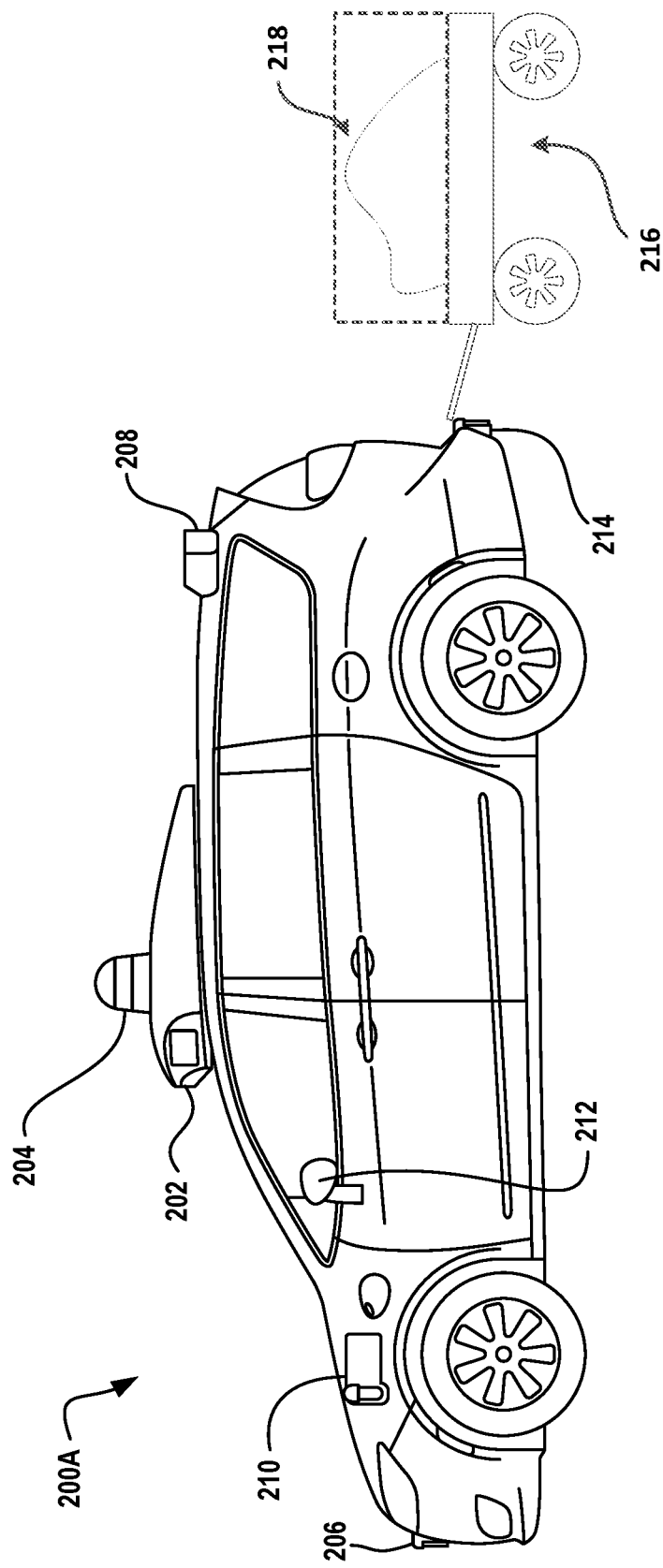
FIG. 2A illustrates a physical configuration of a vehicle, in accordance with example embodiments.

FIG. 2A illustrates a physical configuration of a vehicle, in accordance with example embodiments. In some aspects, FIG. 2A shows an example vehicle 200A that can include some or all of the functions described in connection with vehicle 100 in reference to FIG. 1. Although vehicle 200A is illustrated in FIG. 2A as a van for illustrative purposes, the present disclosure is not so limited. For instance, the vehicle 200A can represent a truck, a car, a semi-trailer truck, a motorcycle, a golf cart, an off-road vehicle, a farm vehicle, etc. that can be configured to pull a trailer 216 with payload 218. Although a single trailer 216 carrying a single payload 218 is shown for illustrative purposes, the same techniques apply to a vehicle 200A configured to pull a plurality of trailers with a plurality of respective payloads.

Trailer 216 is shown as an open trailer for illustrative purposes only, but can be any object configured to carry payload 218. For example, the dashed lines may indicate an exterior of trailer 216 with payload 218 that is located within an interior of the dashed lines. Also, for example, trailer 216 may be equipped with one or more of in-trailer radars, LIDARS, or cameras for visual inspection of the interior of trailer 216. As another example, a brake temperature sensor on the trailer may be utilized as a safety mitigation to maintain a temperature of brakes within safety thresholds. A rise in brake temperatures may relate to a mass of the payload, and in some aspects, brake temperature may be a factor in a determination of the confidence level. Trailer 216 can be permanently attached to vehicle 200A, or may be detachable from vehicle 200A. Also, for example, payload 218 can be any form of payload to be transported by vehicle 200A. For a class 8 truck, a trailer is configured with brake actuation. There are also examples of steerable trailers. Trailers may also be configured to have brakes controlled from a vehicle (e.g., by a human driver in a truck).

The example vehicle 200A includes a sensor unit 202, a first LIDAR unit 204, a second LIDAR unit 206, a radar unit 208, a LIDAR/radar unit 210, and two additional locations 212, 214 at which an accelerometer, a gyroscope, a radar unit, LIDAR unit, laser rangefinder unit, and/or other type of sensor or sensor(s) could be located on the vehicle 200A. The LIDAR/radar unit 210 can take the form of a LIDAR unit, a radar unit, or both.

Furthermore, the example vehicle 200A can include any of the components described in connection with vehicle 100 of FIG. 1. The radar unit 208, and/or the LIDAR units 204, 206 can actively scan the surrounding environment for the presence of potential obstacles and can be similar to the radar 126 and/or laser rangefinder/LIDAR 128 in the vehicle 100. As another example, an accelerometer at location 212 can be similar to the accelerometer included in IMU 124 in the vehicle 100.

Sensor unit 202 may be mounted atop the vehicle 200A and include one or more sensors configured to detect information about an environment surrounding the vehicle 200A, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200A. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Furthermore, each sensor of sensor unit 202 can be configured to be moved or scanned independently of other sensors of sensor unit 202.

Although not shown in FIG. 2A, the vehicle 200A can include a wireless communication system. The wireless communication system may include wireless transmitters and receivers that could be configured to communicate with devices external or internal to the vehicle 200A. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200A can include a camera, possibly at a location inside sensor unit 202. The camera can be a photosensitive instrument, such as a still camera, a video camera, etc., that is configured to capture a plurality of images of the environment of the vehicle 200A. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

FIGS. 2B-C illustrate an example tractor-trailer configuration, in accordance with example embodiments. The tractor-trailer configuration may relate to a tractor-trailer truck. The truck may include, e.g., a single, double or triple trailer, or may be another medium or heavy duty truck such as in commercial weight classes 4 through 8. As shown, the truck includes a tractor unit 220 and a single cargo unit or trailer 222. The trailer 222 may be fully enclosed, open such as a flatbed, or partially open depending on the type of cargo to be transported. The tractor unit 220 includes the engine and steering systems (not shown) and a cab 224 for a driver and any passengers. In a fully autonomous arrangement, the cab 224 may not be equipped with seats or manual driving components, since no person may be necessary.

The trailer 222 includes a hitching point, known as a hitching point 226. The hitching point 226 is typically formed as a solid steel shaft, which is configured to pivotally attach to the tractor unit 220. In particular, the hitching point 226 attaches to a trailer coupling, known as trailer coupling 228, that is mounted rearward of the cab. For a double or triple tractor-trailer, the second and/or third trailers may have simple hitch connections to the leading trailer. Or, alternatively, according to one aspect of the disclosure, each trailer may have its own hitching point. In this case, at least the first and second trailers could include a trailer coupling type structure arranged to couple to the next trailer.

As shown, connectors 230) and 232 also couple from the tractor unit 220 to the trailer 222. These may include one or more air hoses 230 and one or more electrical conduits 232. The air hose(s) 230 enables the tractor unit 220 to operate the pneumatic brakes of the trailer 222, and the electrical conduit(s) 232 provide power and signals to the brakes and lights of the trailer 222. In an autonomous system, it may be difficult or unfeasible to manually connect the air hoses, electrical conduits and other connectors between the tractor unit 220 and trailer 222.

Figure 2D:
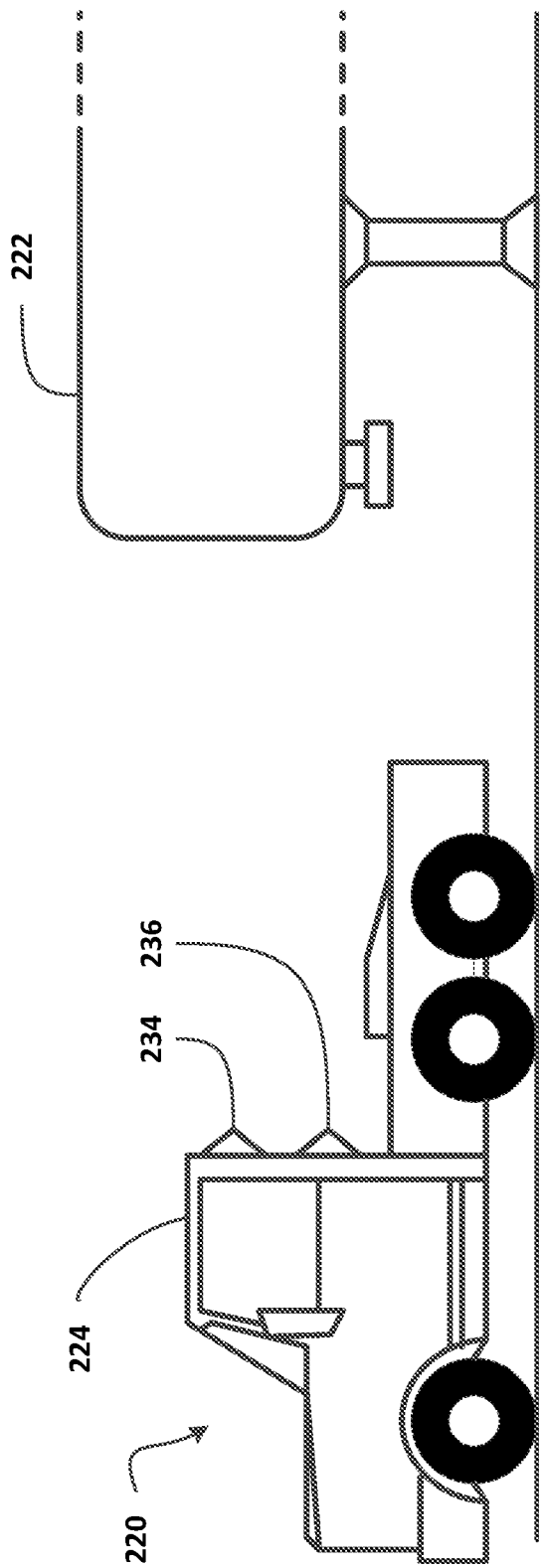
FIG. 2D illustrates an example sensor arrangement on a vehicle, in accordance with example embodiments.

FIG. 2D illustrates an example sensor arrangement on a vehicle, in accordance with example embodiments. In one scenario, the sensors may provide sufficient information to indicate the relative position and alignment of the tractor unit and the trailer. However, in another scenario, other sensors may be employed to provide this information. FIG. 2D is a side view of a tractor unit 220 and a portion of a single cargo unit or trailer 222 to which the tractor unit 220 will couple. As shown, one or more rear sensors 234, 236 are provided on the back of the cab 224, which may be used to identify a relative positioning of the trailer 222 to the tractor unit 220, so that the hitching point (e.g., hitching point 158) can be aligned and capture the trailer coupling (e.g., trailer coupling 156). In some embodiments, the rear sensor(s) 234, 236 may include Lidar sensors, camera sensors, or both. Other sensors may also be employed, such as sonar and/or radar. In some embodiments, a pair of rear sensors 234, 236 may be disposed on the left and right sides of the back of the cab 224. Also, for example, a rear sensor may be disposed centrally on the back of the cab 224. The exact position, height and orientation of the rear sensor(s) 234, 236 may depend on the specific configuration of the cab 224 and/or the type of trailer 222 to be hitched to the tractor unit 220).

Understanding characteristics of a payload, and its physical interactions with a trailer and/or a vehicle/tractor pulling the trailer, may be challenging. This is because many of the characteristics of the payload may be unknown. For example, a carrier vehicle with a trailer may drive up to the payload, and the payload may be loaded into or onto a trailer, and no further information about the payload may be available to the carrier vehicle. Therefore, any information in terms of observing characteristics of the payload may not be available to the carrier vehicle. Thus, existing technology that are based on a knowledge of direct observable characteristics of the payload may no longer be applicable.

Beneficially, the techniques described herein can be employed without requiring any sensors on the payload. Also, for example, the techniques described herein may be performed in an absence of an in-trailer radar, an in-trailer LIDAR, and/or an in-trailer camera. Instead, the analysis described herein is based on observing a response of the vehicle to estimate the properties of the payload. However, the techniques described herein may be used in conjunction with additional sensors on the trailer, the payload, and so forth.

A control system of the vehicle 200A may be configured to control the vehicle 200A in accordance with a control strategy from among multiple possible control strategies. The control system may be configured to receive information from sensors coupled to the vehicle 200A (on or off the vehicle 200A), modify the control strategy (and an associated driving behavior) based on the information, and control the vehicle 200A in accordance with the modified control strategy. The control system further may be configured to monitor the information received from the sensors, and continuously evaluate driving conditions; and also may be configured to modify the control strategy and driving behavior based on changes in the driving conditions. In some embodiments, the sensor may be one or more of: an inertial measurement unit, a laser measurement unit for trailer articulation, a roll sensor to measure a body roll, a pitch sensor to measure pitch data, or a pressure sensor mounted on a suspension of a tractor, a trailer, or both, to measure a response of the suspension.

To facilitate this, the control system may receive, from a plurality of sensors configured to capture sensor data related to the vehicle, the trailer, or both, the sensor data. Generally, the sensors may be configured to capture data related to, for example, information associated with an environment of the vehicle (e.g., nearby objects, weather, topography, traffic lights, and so forth), as well as a response of the vehicle to the environment (e.g., a driving strategy), and/or one or more commands sent to components of the vehicle (e.g., brakes, steering, propulsion), and so forth. For example, the sensor data may capture road bank and grade information. As another example, the sensor data may be indicative of an alignment of the trailer relative to the vehicle. The control system may be configured to determine, based on the captured sensor data, one or more parameters associated with the trailer and the payload. For example, the one or more parameters associated with the trailer and the payload may include at least one of a pay load size, payload arrangement on the trailer, a weight of the payload, or a center of gravity of the payload.

For example, the control system may be configured to determine a location and/or change in a center of gravity (CG) of a trailer (e.g., trailer 220). For example, the control system may retrieve initial information from springs, such as, for example, a mechanical spring, an air spring, and so forth. In some aspects, an air suspension in a trailer may be used to infer the load on the trailer axle either by observing a deflection of the mechanical springs, or a pressure in an air spring of the trailer. Air pressure on the suspension may be observed from a tractor (e.g., tractor 222). Since the trailer rests on the tractor via a hitch, information about the trailer may be determined. Generally, technology may be retrofitted onto a trailer that can provide such estimates for the payload. For example, the trailer may be unbalanced toward the front, but balanced toward the rear. Accordingly, by maneuvering the vehicle, the control system may narrow down an uncertainty around various parameters. As the uncertainty is decreased, there is a concomitant increase in a confidence level associated with the estimates of the parameters. For example, the control system may execute a more conservative initial driving strategy, and then as the uncertainty decreases and the confidence level increases, the control system may conform the driving strategy to align more precisely to the estimates of the parameters.

For example, at the beginning of a drive, when a vehicle is stationary, the payload mass may be estimated to be between an unladen weight (say 30,000 lbs.) and a total gross vehicular weight (say 80,000 lbs.). The driving strategy may range from gentle braking (e.g., applying less torque) with an unladen weight, to a greater application of the brakes (e.g., apply more torque) when the payload is fully loaded. Accordingly, the control system may perform calibration maneuvers to determine a better understanding of the payload weight parameters. Therefore, a first maneuver may be an acceleration of the vehicle that ignores the braking altogether. A reasoning for such a choice may be that since the weight parameters are unknown, and being able to brake efficiently and accurately is of high significance for a successful driving strategy, accelerating and then decelerating may be appropriate maneuvers. For example, using Newton's formula relating force and mass, $F = m \cdot a$, a knowledge of the acceleration and a force applied, would help determine the mass. In some embodiments, the control system may determine an amount of force applied in a given time and obtain a more accurate estimate for the payload mass. For example, the control system may determine that the payload mass is between 40,000 lbs. and 50,000 lbs. A given vehicle and a given trailer may have performance limits for a range of mass for a payload. Accordingly, as a better estimate for the mass is obtained (e.g., iteratively), the confidence level for the braking strategy is increased, and the control system is able to apply a more precise braking strategy.

Although the preceding example is related to an estimation of the mass of the payload, in general, estimates may involve a plurality of factors related to an operation of the vehicle, the trailer, and/or the payload, and physical interactions between these objects. Therefore, the one or more parameters representing the plurality of factors may be iteratively adjusted to reduce uncertainty and increase confidence levels.

For example, the control system may determine attributes of a center of gravity of the payload. The CG may include three components. For a lateral offset for the CG (e.g., as the CG is displaced to the left and to the right), the roll angle will change. For example, the control system may receive sensor data from a roll sensor of the vehicle, where the sensor data indicates changes in a roll angle. Generally, when there is a lateral offset of the CG, an acceleration may cause a lateral force at the hitch acting on the trailer in a direction of the lateral offset, and braking may cause a lateral force at the hitch acting on the trailer to a side opposite to a direction of the lateral offset is. The control system may observe parameters of vehicular steering that is necessitated by a lateral offset. Such data may enable the control system to iteratively refine its measurements for the lateral offset, thereby providing more refined estimates for a lateral component of the CG.

For a longitudinal component of the CG, a longitudinal offset may be estimated. For example, a mass of the vehicle may be a known quantity, and the payload may be sensed on the rear axle of the trailer. Upon execution of an acceleration, the control system may be able to gain an understanding of a total mass of the vehicle. Accordingly, the control system may have knowledge of measurements from a first axle, a second axle, and the total mass, and the control system may estimate the longitudinal offset for the CG based on these parameters.

In some embodiments, a vertical component of the CG may be observed from turns. For example, when a turn operation is executed, a higher position of the CG may result in a higher roll measurement. Also, for example, when a braking operation is executed, a higher position of the CG may result in a larger displacement of the longitudinal component of the CG from the rear to the front. Generally, the control system may receive sensor data from a roll sensor that is indicative of changes to the roll, and determine the vertical component of the CG based on the received sensor data. Also, for example, when a vehicle is accelerated, or when brakes are applied, a corresponding moment to counteract a higher location of the CG may be measured by vertical forces at the first and second axles. For example, this may be measured with pressure and/or displacement sensors in a suspension for the drive axles. Such a counteracting moment results in a higher force. Generally, the payload itself may not be physically displaced. However, movement of the vehicle and/or trailer may displace a CG of the payload.

Generally, a control system of an autonomous vehicle is configured to detect a banked road, a pitched road, and so forth. For example, the confidence level may be determined by sensing a load transfer as a result of a road bank and/or grade. In some embodiments, the vehicle may be driven over an exit ramp of a highway to determine the one or more parameters. For example, a higher CG may accentuate a roll angle at a bank of an exit ramp. Accordingly, the control system may receive and analyze additional information based on the pitch and roll around banks. In some embodiments, the control system may trigger collection of such additional information, and update the confidence level based on the additional information. Also, for example, one or more calibration maneuvers may be configured based on a planned route. For example, a planned route may include a turn, a grade, a bank, a stretch of level highway, and so forth. Accordingly, the control system may plan performance of calibration maneuvers at such locations in an effort to maintain a level of high information content, low uncertainty, and high confidence levels.

In some embodiments, a payload may be associated with a bill of lading. For example, at the time of loading, a carrier may be provided with a bill of lading that indicates certain base parameters for the payload. Base parameters may include, for example, a destination for the payload, a weight, a quantity, a monetary value, a freight classification, and so forth. Over time, based on a plurality of bills of lading, the control system may be able to determine initial parameters. For example, the payload may comprise beer or soda cans. Liquid is generally very dense, and there are limited alternative configurations for stacking the cans in such a payload. Accordingly, an initial driving strategy may be configured to be very close to driving limits, with a small buffer between actual and permissible driving limits. Therefore, given a type of payload, and associated weight characteristics, the physical loading scenarios for the trailer may be subject to initial constraints. Accordingly, an initial set of parameters may be determined with a high confidence level.

In some embodiments, such information may be stored as a matrix that may constrain an initial estimate of payload characteristics. For example, one or more parameters associated with the trailer and the payload (e.g., from a bill of lading) may be associated with operational limits for vehicular and/or trailer operation. An initial configuration may be based on such a matrix. Also, for example, the matrix may be updated over time as the one or more parameters are refined, and the confidence level is updated. Also, for example, such a matrix may be stored in a memory component, and accessible to the control system. In some embodiments, a central server may maintain a repository of a plurality of such matrices, for different vehicles, trailers, and so forth.

The control system may be further configured to update, based on an analysis of the one or more parameters, a confidence level associated with an operation of the vehicle with the trailer and the payload. Generally, the confidence level is indicative of a degree of confidence with which a vehicle can be operated. For example, when a trailer is loaded, there may be initial limits to various driving configurations (e.g., acceleration, braking, turn, and so forth). Accordingly, the control system may initially conform to a performance envelope comprising these initial limits. For example, the control system may execute an initial driving strategy that operates well within the performance limits (e.g., with a large buffer between actual operating values, and limits of the operating values). However, as uncertainty about the payload decreases (e.g., based on historical performance, preliminary and/or calibration maneuvers, operation of the vehicle on a route, and so forth), and the confidence level increases, the control system may adjust the actual operating values closer to the allowable limits of the operating values.

In some embodiments, the confidence level may be a range estimation. For example, with reference to the example determination of a lateral offset for the CG, the confidence level may indicate, for example, that the lateral offset is 5 cm. from the vehicle, with a margin of error of ±1 cm. As another example, the confidence level may indicate, for example, that the vehicle mass is between certain minimum and maximum values, and within a specified range for a margin of error. As the margin of error decreases, the confidence level increases. In some embodiments, an initial confidence level may be determined based on historical operating values of similar vehicles or the same vehicle, similar trailers or the same trailer, and/or a similar payload. The confidence level may be updated based on preliminary maneuvers and/or calibration maneuvers or over the course of a trip.

In some embodiments, the confidence level may be an outcome such as "Safe", "Very Safe," "Risky," and so forth. In some embodiments, the confidence level may be an outcome such as "Very High Confidence," "High Confidence," "Medium Confidence," "Low Confidence," "Very Low Confidence," and so forth. In some embodiments, the confidence level may be a numerical value, such as between "0" and "1," with "0" being indicative of very low confidence, and "1" being indicative of very high confidence The control system may be configured to update a confidence level associated with an operation of the vehicle with the trailer and the payload. As described herein, the control system may use sensor data to understand properties of a payload to determine a confidence level that can be used to determine navigation strategy by the autonomous vehicle pulling the payload. For example, initial measurements can be captured upon attaching the autonomous vehicle to the trailer prior to any motion by the vehicle. For example, the vehicle may be made to perform some preliminary maneuvers so that an initial calibration can be performed. For example, the vehicle may be driven at various speeds, made to accelerate and/or decelerate, make turns, etc. Such initial calibration may be used by the control system to generate an initial confidence level.

In some embodiments, the control system may update the confidence level by determining an initial confidence level subsequent to the trailer being connected to the vehicle, and prior to a movement of the vehicle. The vehicle may be made to perform additional maneuvers to collect more information about the payload via the vehicle sensors, and the control system may adjust the confidence level based on this.

Different motions may provide information about the payload. For example, acceleration, deceleration, driving on a gradient, and/or turns, may cause a payload to shift. Such changes in a characteristic of the payload may be detected to reduce uncertainty, and thereby increasing the confidence level. For example, the control system may initiate one or more maneuvers that enable the sensor to obtain additional data to be utilized to update the initial confidence level. In some embodiments, the updating of the confidence level may include determining an initial confidence level subsequent to the trailer being connected to the vehicle, and prior to a movement of the vehicle, and wherein the one or more maneuvers includes one or more preliminary maneuvers to measure the one or more parameters by accelerating or decelerating the vehicle without turning. In some embodiments, the updating of the confidence level may include determining an initial confidence level subsequent to the trailer being connected to the vehicle, and prior to a movement of the vehicle, and wherein the one or more maneuvers comprises one or more preliminary maneuvers to measure the one or more parameters by turning the vehicle.

Generally, an ability to determine accurate limits for vehicular and/or trailer operational limits may be advantageous. However, there may be some trade-offs between reducing uncertainty and increasing information content, and consequently increasing the confidence level. For example, even though a sharp turn maneuver may provide a high information content about a payload, such a maneuver may not be advisable for a given type of the vehicle, trailer, and/or payload. Accordingly, even though a gentler turn may provide a low information content, such a maneuver may be safer. Accordingly, instead of attaining an optimal confidence level at a first iteration of the preliminary maneuvers in an effort to eliminate all uncertainty, the confidence level may be gradually updated over time. For example, exceeding a roll threshold may be an event that provides high information content, but may not be a practical preliminary maneuver. In some embodiments, the control system may be configured to identify safe operational bounds within permissible operational limits, and may sacrifice higher information content by staying within such safe operational bounds, thereby accepting a certain level of uncertainty.

Although an initial confidence level may be determined prior to a vehicle being driven autonomously on a planned route (e.g., from historical performance values, and/or preliminary maneuvers), in some aspects, the confidence level can be updated in real-time while the vehicle is being driven autonomously (e.g., based on calibration maneuvers). Also, for example, the confidence level may be different at different times. For example, a first confidence level may be used for an initial calibration. However, the first confidence level may be updated after initial calibrations are completed.

Also for example, the first confidence level may be applied to determine an initial autonomous control strategy when a vehicle (e.g., in static mode) is first connected to a payload. A second confidence level may be applied to determine an updated autonomous control strategy based on preliminary maneuvers performed prior to an on-road operation of the vehicle, and/or calibration maneuvers performed during an on-road operation of the vehicle. For example, a weight of a payload on a drive axle relative to trailer axles may be measured before turning operations, and the confidence level may be adjusted. As another example, the confidence level may be updated based on measurements that are obtained during one or more turns to gain confidence with respect to a center of gravity of the payload.

In some embodiments, the updating of the confidence level may be based on a road characteristic of a portion of a planned route. For example, the road characteristic may include a condition of the road, such as, for example, known potholes, driving surface (e.g., concrete, macadamized, dirt, wet, slippery), constructions, closures, grade, slope of the grade, turn, angle and direction of the turn, traffic conditions, and so forth. In some embodiments, the updating of the confidence level may be based on weather data for a portion of a planned route. For example, the confidence level may be adjusted based on whether there is rain, snow, fog, mist, high winds, and so forth. In some embodiments, the updating of the confidence level may be performed at specified intervals of time to maintain the vehicle within safe operational limits.

In some embodiments, a vehicle may be driven along a long stretch of highway, and values of some of the parameters may drift, or become unknown, or maneuvers may not be informative any more. For example, the vehicle may have not accelerated or decelerated, or executed turns, encountered grades or banks, and so forth. Accordingly, the control system may not have determined updated values for the one or more parameters associated with the trailer and the payload (e.g., location of the CG). Accordingly, the control system may determine that the uncertainty with regards to the one or more parameters has increased, thereby decreasing a confidence level of the driving strategy. For example, even in instances where a calibration may have been performed in the recent past, the control system may determine that the information content is low, and uncertainty has increased. Accordingly, the control system may perform a re-calibration of the one or more parameters to determine an updated confidence level. For example, the control system may determine, based on sensor data from radars, LIDARS, cameras, and so forth, that there are no vehicles in a vicinity of the vehicle, and may initiate one or more calibration maneuvers. For example, in an absence of any vehicles in front, the control system may cause the vehicle to accelerate, decelerate, turn, change lanes, etc. to determine the one or more parameters, and reduce the uncertainty. As another example, the control system may utilize geo-locational data to determine that an exit ramp is forthcoming, and may cause the vehicle to take the exit ramp to determine the one or more parameters, and reduce the uncertainty. Also, for example, the control system may utilize geo-locational data to determine that an empty space is available to perform additional calibration maneuvers, and may cause the vehicle to drive to the available space to perform the additional calibration maneuvers. Generally, the control system may attempt to maintain a threshold level of information content, and upon a determination that the information content is below the threshold level (e.g., indicating that uncertainty has increased beyond acceptable limits), the control system may initiate one or more calibration maneuvers.

The control system may be additionally configured to, based on the confidence level, responsively execute an autonomous control strategy comprising one or more adjustments to the operation of the vehicle. For example, a control strategy can be determined for the vehicle based on the confidence level. For example, the control system may make an adjustment to an autonomous navigation strategy for the vehicle. In some embodiments, the adjustment to the autonomous navigation strategy may include recommending a speed strategy for the vehicle for a portion of a planned route. For example, higher speeds may cause the payload to shift, and accordingly, the autonomous navigation strategy may include recommending a slower speed. As another example, braking hard may cause the payload to shift, and accordingly, the autonomous navigation strategy may include recommending a gentler braking process. In some embodiments, the adjustment to the autonomous navigation strategy may include recommending a turn strategy for the vehicle for a portion of a planned route. For example, based on an angle of the turn, the speed and/or acceleration may be adjusted accordingly so as not cause the payload to shift, thereby causing a confidence level to be decreased.

Generally, adjustments may be performed in a continuous manner. For example, with the lateral offset for the CG, the control system may not know this characteristic initially, and may execute extra wide turns to compensate for a potentially large lateral offset. For example, a large buffer is maintained between actual turn limits and allowable turn limits on either side, based on a lack of information of a direction or magnitude of the lateral offset. But as the control system determines the lateral offset with a smaller margin of error, a confidence level increases, and the autonomous control strategy may be adjusted accordingly. For example, the control system may determine that the lateral offset is displaced to the left within a certain margin of error. Accordingly, the control system may bias the vehicle to turn to compensate for the updated value of the lateral offset. Thus, the large buffer may be reduced to a smaller buffer so that the vehicle may be operated within more precise operating limits. Generally, such precision may be gained gradually as the confidence level increases.

In some embodiments, the confidence level may be updated based on a historical value of a performance limit associated with the trailer. The historical value of the performance limit of the trailer may be retrieved from a repository of historical values of performance limits associated with a plurality of trailers. For example, a cloud database may be generated with a vehicle identification number (VIN) associated with a trailer. The cloud database may collect information for individual trailers, as each trailer may operate in a different manner. For example, a brake system in one trailer may be different than a brake system in another trailer. For example, a trailer may display a characteristic of being pulled in one direction, such as preferring one side over another. By collecting and analyzing data over time, trailer characteristics may be identified and factored in a determination of the one or more parameters associated with the trailer and the payload. Also, for example, a first trailer may display a characteristic of having a very stiff suspension; as a result, a lateral offset of the CG for the first trailer may induce a small displacement of a roll angle. However, a second trailer may display a characteristic of having a very soft suspension; as a result, the same lateral offset of the CG may induce a larger displacement of the roll angle for the second trailer. Accordingly, unless the different suspension types are factored in, the control system and/or remote server may overestimate or underestimate the lateral offset.

The cloud database may store information about how a trailer behaves without a payload, and with a payload, with payloads of different characteristics (weight, shape, size, type of payload such as liquid, solid, etc.), and/or behavior of the trailer with different vehicles. Generally, expected characteristics of a trailer may be observed and recorded over time. For example, when a VIN is first identified, there may be some baseline understanding of payload characteristics. For example, a first time a trailer is observed, combined properties of the payload and the vehicle together may be estimated. However, as a performance of the trailer is observed over time, expected properties of the trailer may be determined, and these expected properties may be used to bootstrap and/or jumpstart estimates about a new payload.

Historical data associated with a trailer may provide additional information about the one or more parameters associated with the vehicle and/or trailer. For example, the trailer may have carried a payload of a specified weight in the past. When a new payload with a similar weight is to be loaded, the control system may determine baseline estimates for the payload characteristics based on historical data about the trailer, without any information about an actual weight distribution of the new payload. As various examples and embodiments have illustrated, a joint behavior of a payload and a trailer may be estimated to design more accurate autonomous control strategies. For example, based on data on multiple payloads and multiple trailers, a matrix of data points may be generated. Although one trip may not be sufficient to differentiate between trailer characteristics and payload characteristics, such differences may be discerned over a large number of different trips. Accordingly, the entries of the matrix may be refined over time.

Based on historical data, the control system may determine an optimal payload for a trailer. Also, for example, the cloud database may store information related to trailer maintenance, such as, for example brakes, suspensions, anti-braking systems, wheels, tires, and so forth. Based on such stored information, the remote computing device may provide some prognosis back to an owner of a trailer or a shipper associated with the trailer. For example, the remote computing device may send notifications with regards to a status of brakes, tires, suspension adjustments, and so forth.

In some embodiments, statistical modeling may be applied to learn various initial configurations for the autonomous control strategy. For example, a machine learning model may be trained on a plurality of bills of lading to apply natural language processing to output initial configurations for the autonomous control strategy. Also, for example, a machine learning model may be trained on a plurality of matrices of data relating to vehicular limits, trailer capacities, payload characteristics, and associated configurations, and/or matrix data on multiple payloads and multiple trailers, to output initial configurations for the autonomous control strategy. Also, for example, a machine learning model may be trained on a plurality of historical values of a performance limit associated with a trailer, and output initial configurations for the autonomous control strategy.

As such, trained machine learning model(s) can include one or more models of one or more machine learning algorithms. Machine learning algorithm(s) may include, but are not limited to: an artificial neural network (e.g., a convolutional neural network, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) may be supervised or unsupervised, and may implement any suitable combination of online and offline learning. During a training phase, machine learning algorithm(s) can be trained by providing at least training data as training input using unsupervised, supervised, semi-supervised, and/or reinforcement learning techniques. In some examples, machine learning algorithm(s) and/or trained machine learning model(s) can use transfer learning techniques. For example, transfer learning techniques can involve trained machine learning model(s) being pre-trained on one set of data and additionally trained using training data.

III. EXAMPLE REMOTE SYSTEMS

Figure 3:
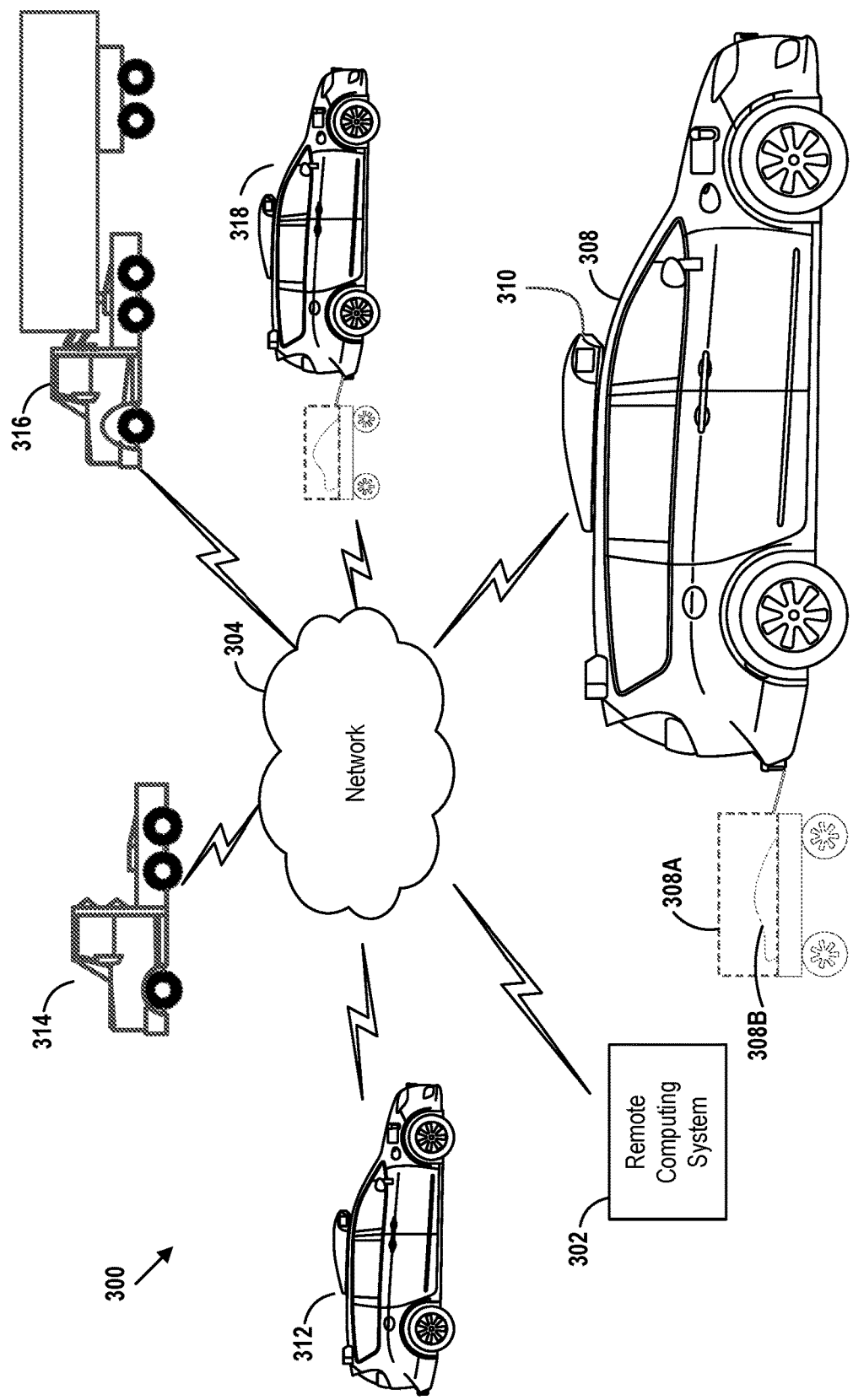
FIG. 3 is a conceptual illustration of wireless communication between a remote computing system and a plurality of autonomous vehicles, in according to example embodiments.

FIG. 3 is a conceptual illustration of wireless communication between a remote computing system and a plurality of autonomous vehicles, according to example embodiments. In particular, wireless communication may occur between remote computing system 302 and vehicle 308 via network 304. Wireless communication may also occur between remote computing system 302 and vehicles 312, 314, 316, and 318. In some embodiments, communication may also occur between a server computing system (not shown in FIG. 3) and remote computing system 302, and between the server computing system and vehicle 308.

Example vehicle 308 includes an image sensor 310. The image sensor 310 is mounted atop the vehicle 308 and includes one or more image capturing devices configured to detect information about an environment surrounding the vehicle 308, and output indications of the information. For example, image sensor 310 can include one or more cameras. The image sensor 310 can include one or more movable mounts that could be operable to adjust the orientation of one or more cameras in the image sensor 310. In one embodiment, the movable mount could include a rotating platform that could scan cameras so as to obtain information from each direction around the vehicle 308. In another embodiment, the movable mount of the image sensor 310 could be movable in a scanning fashion within a particular range of angles and/or azimuths. The image sensor 310 could be mounted atop the roof of a car (e.g., vehicle 100), although other mounting locations are possible.

Additionally, the cameras of image sensor 310 could be distributed in different locations and need not be collocated in a single location. Furthermore, each camera of image sensor 310 can be configured to be moved or scanned independently of other cameras of image sensor 310.

Remote computing system 302 may represent any type of device related to remote assistance techniques, including but not limited to those described herein. Within examples, remote computing system 302 may represent any type of device configured to (i) receive sensor data captured by a plurality of sensors of a vehicle 308 that is operable to pull a trailer 308A comprising a payload 308B, wherein the sensor data is related to the vehicle 308, the trailer 308A, or both, (ii) determine, based on the sensor data, one or more parameters associated with the trailer 308A and the payload 308B, (iii) update, based on an analysis of the one or more parameters, a confidence level associated with an operation of the vehicle 308 with the trailer 308A and the payload 308B; and (iv) based on the confidence level, cause the vehicle 308 to perform one or more adjustments corresponding to an operation of the vehicle 308.

In some embodiments, the confidence level may be determined by remote computing system 302 based on historical values of one or more performance limits associated with a vehicle, a trailer, and/or a payload. The historical values may be retrieved from a repository of historical values of performance limits associated with a plurality of vehicles, trailers, and/or payloads. For example, the performance limit of the trailer may include data related to one or more of a braking system for the trailer, a suspension system for the trailer, an anti-braking system for the trailer, and behavior characteristics of the trailer without a payload.

Accordingly, remote computing system 302 may be configured to determine an updated value of the performance limit. Remote computing system 302 may also be configured to determine whether the updated value of the performance limit is outside an expected range for a value of the performance limit. As a confidence level increases, there may be greater understanding of operational events that may fall outside a threshold of confidence level. For example, outlier detection, such as detection of an error condition may be enabled, and upon detection of an error condition, a notification may be triggered. For example, the control system in a vehicle 308 and/or remote computing device 302 may detect that a lateral offset has exceeded a previously recorded value by a certain threshold, and may infer that the payload has likely shifted physically. Accordingly, the vehicle 308 may be caused to stop, and have the payload inspected, and/or a re-calibration of the one or more parameters to update the confidence level may be initiated.

Remote computing system 302 may be additionally configured to adjust the autonomous control strategy based on the updated value of the performance limit being outside the expected range. For example, remote computing system 302 may send an instruction to the vehicle 308 to perform one or more calibration maneuvers. Also, for example, remote computing system 302 may send an instruction to the vehicle 308 to safely exit driving mode, or switch from an autonomous to manual driving mode. Although the remote computing system 302 may perform some analysis in the cloud, in some embodiments, a control system of the vehicle 308 may be configured to identify whether the updated value of the performance limit is outside an expected range for a value of the performance limit, and initiate appropriate corrective action.

In some embodiments, remote computing system 302 may be configured to collect values of performance limits associated with a plurality of trailers (e.g., associated with vehicles 312, 314, 316, and/or 318). Remote computing system 302 may also be configured to generate the repository of historical values based on the collected values of performance limits.

In some embodiments, remote computing system 302 may be configured to determine, at the remote computing device and based on historical values of performance limits associated with a given trailer, an optimal payload for the given trailer. Remote computing system 302 may be additionally configured to communicate, to a vehicle (e.g., vehicle 308, 321, 314, 316, and/or 318) associated with the given trailer, the optimal payload.

Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and one or more of vehicles 308, 312, 314, 316, and 318. Network 304 also enables wireless communication between a server computing system and remote computing system 302, and between the server computing system and one or more of vehicles 308, 312, 314, 316, and 318.

The position of remote computing system 302 can vary within examples. For instance, remote computing system 302 may have a remote position from vehicle 308 that has a wireless communication via network 304. In another example, remote computing system 302 may correspond to a computing device within vehicle 308 that is separate from vehicle 308, but with which a human operator can interact while a passenger or driver of vehicle 308. In some examples, remote computing system 302 may be a computing device with a touchscreen operable by the passenger of vehicle 308.

In some embodiments, operations described herein that are performed by remote computing system 302 may be additionally or alternatively performed by vehicle 308 (i.e., by any system(s) or subsystem(s) of vehicle 308). In other words, vehicle 308 may be configured to provide a remote assistance mechanism with which a driver or passenger of the vehicle can interact.

A server computing system (e.g., a repository for information associated with one or more trailers) may be configured to wirelessly communicate with remote computing system 302 and vehicle 308 via network 304 (or perhaps directly with remote computing system 302 and/or vehicle 308). The server computing system may represent any computing device configured to receive, store, determine, and/or send information relating to vehicle 308 (e.g., performance limits) and the remote assistance thereof. As such, the server computing system may be configured to perform any operation(s), or portions of such operation(s), that is/are described herein as performed by remote computing system 302 and/or vehicle 308. Some embodiments of wireless communication related to remote assistance may utilize a server computing system, while others may not.

The server computing system (e.g. a repository of historical values of performance limits) may include one or more subsystems and components similar or identical to the subsystems and components of remote computing system 302 and/or vehicle 308, such as a processor configured for performing various operations described herein, and a wireless communication interface for receiving information from, and providing information to, remote computing system 302 and vehicle 308.

In line with the discussion above, a computing system (e.g., remote computing system 302, or a computing system local to vehicle 308) may operate to use a camera to capture images of the environment of an autonomous vehicle. In general, at least one computing system will be able to analyze the images and possibly control the autonomous vehicle.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving sensor data. The processing system of the vehicle may alter the control of the vehicle based on sensor data received from the various sensors. In some examples, the vehicle may alter a velocity of the vehicle in response to sensor data from the various sensors. The vehicle may change velocity in order to avoid obstacles, obey traffic laws, etc. When a processing system in the vehicle identifies objects near the vehicle, the vehicle may be able to change velocity, or alter the movement in another way.

Figure 4:
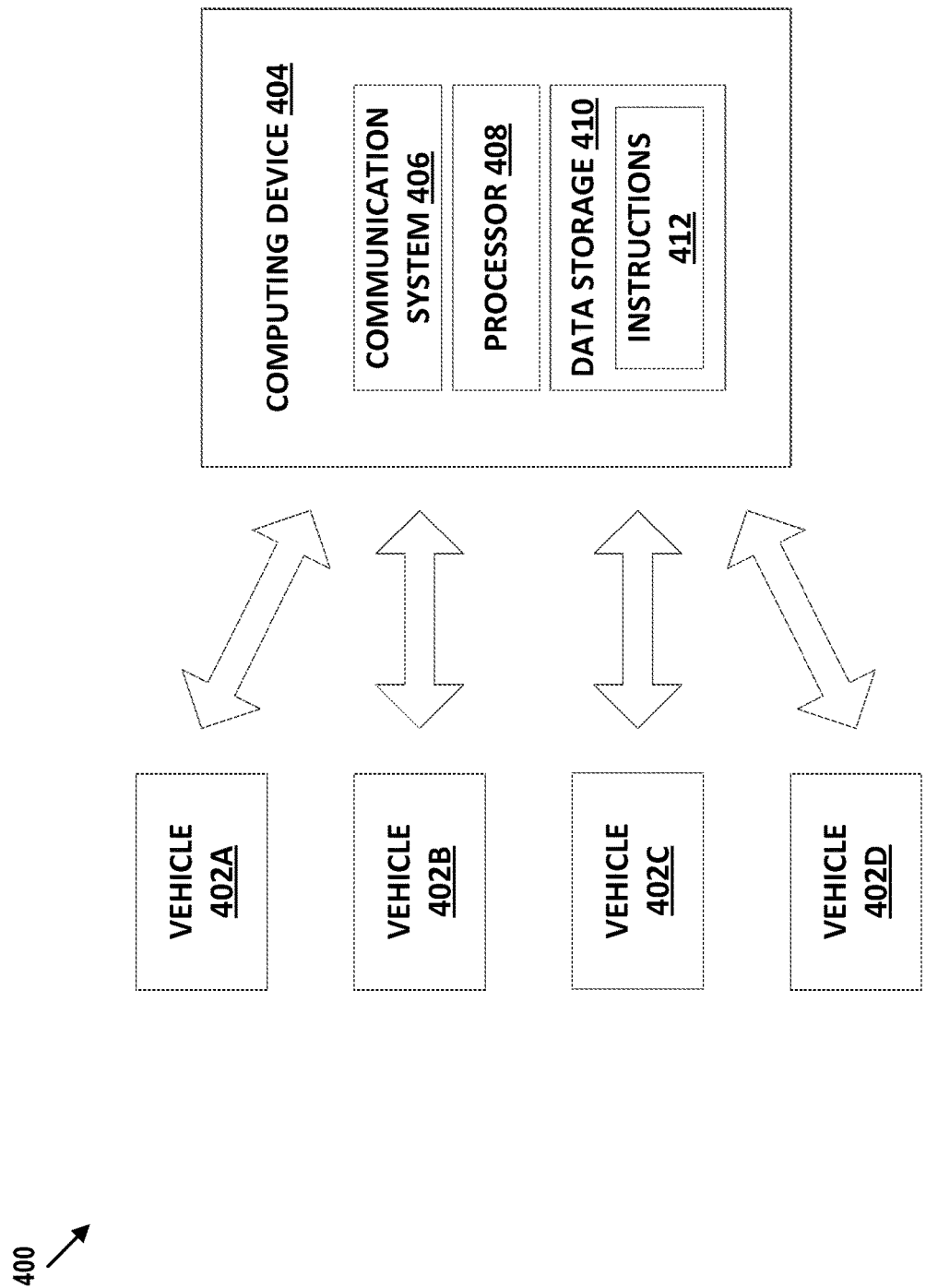
FIG. 4 is a simplified block diagram of a system 300, according to an example embodiment.

FIG. 4 is a simplified block diagram of a system 400, according to an example embodiment. The system 400 includes vehicles 402A-402D communicatively linked (e.g., via wired and/or wireless interfaces) to an external computing device 404. The vehicles 402A-402D and the computing device 404 may communicate within a network. Alternatively, the vehicles 402A-402D and the computing device 404 may each reside within a respective network.

The vehicles 402a-402d may be similar to the vehicles 100-200A, or vehicles 308, 312, 314, 316, and/or 318. For example, the vehicles 402a-402d may be partially or fully autonomous vehicles that each include a sensor (e.g., RADAR, etc.) to detect an environment of the vehicles 402A-402D. The vehicles 402A-402D may include components not shown in FIG. 4, such as a user interface, a communication interface, a processor, and data storage comprising instructions executable by the processor for carrying out one or more functions relating to the data sent to, or received by, the computing device 404. Further, the functions may also relate to control of the vehicles 402A-402D or components thereof, such as sensors, etc. To that end, the functions may also include methods and systems described herein.

The computing device 404 may be configured as a server or any other entity arranged to carry out the functions described herein. Further, the computing device 404 may be configured to send data/requests to the vehicles 402A-402D and/or to receive data from the vehicles 402A-402D. For example, the computing device 404 may collect, from the vehicles 402A-402D, values of performance limits associated with a plurality of trailers, and may generate the repository of historical values based on the collected values of performance limits. Additionally or alternatively, for example, the computing device 404 may function as a medium for sharing the data (e.g., sensor configurations, locations, etc.) between the vehicles 402A-402D. Also, for example, the computing device 404 may, based on historical values of performance limits associated with a given trailer, determine an optimal payload for the given trailer, and communicate, to a vehicle associated with the given trailer, the optimal payload. Although FIG. 4 shows that the vehicles 402A-402D communicate via the computing device 404, in some examples, the vehicles 402A-402D may additionally or alternatively communicate directly with one another.

The computing device 404 includes a communication system 406, a processor 408, and data storage 410. The communication system 406 may be any system configured to communicate with the vehicles 402A-402D, or other entities, either directly or via a communication network, such as a wireless communication network. For example, the communication system 406 may include an antenna and a chipset for wirelessly communicating with the vehicles 402A-402D, servers, or other entities either directly or via a wireless communication network. Alternatively, in some examples, the communication system 406 may include a wired connection to a server or other entity in wireless communication with the vehicles 402A-402D. Accordingly, the chipset or the communication system 406 in general may be arranged to communicate according to one or more types of wireless communication (e.g., protocols) such as BLUETOOTH®, communication protocols described in IEEE 802.11 (including any IEEE 802.11 revisions), cellular technology (such as GSM, CDMA, UMTS, EV-DO, WiMAX, LTE, or 5th generation "5G" cellular), ZIGBEE®, dedicated short range communications (DSRC), and radio frequency identification (RFID) communications, among other possibilities, or one or more types of wired communication such as Local Area Network (LAN), etc. The communication system 406 may take other forms as well.

The processor 408 may comprise one or more special-purpose processors configured to execute various functions described herein. To the extent the processor 408 includes more than one processor, such processors could work separately or in combination. Data storage 410, in turn, may comprise one or more volatile and/or one or more non-volatile storage components, such as optical, magnetic, and/or organic storage, and data storage 410 may be integrated in whole or in part with the processor 408.

In some embodiments, data storage 410 may contain instructions 412 (e.g., program logic) executable by the processor 408 to execute various functions described herein. Data storage 410 may contain additional instructions as well, including instructions to transmit data to, receive data from, interact with, and/or control one or more of the vehicles 402A-402D. The data storage may also include data related to the location of vehicles 402A-402D as well as sensor locations and sensor fields of view for vehicles 402A-402D. The computer system 210 may additionally or alternatively include components other than those shown.

IV. ADDITIONAL EXAMPLE OPERATIONS

Figure 5:
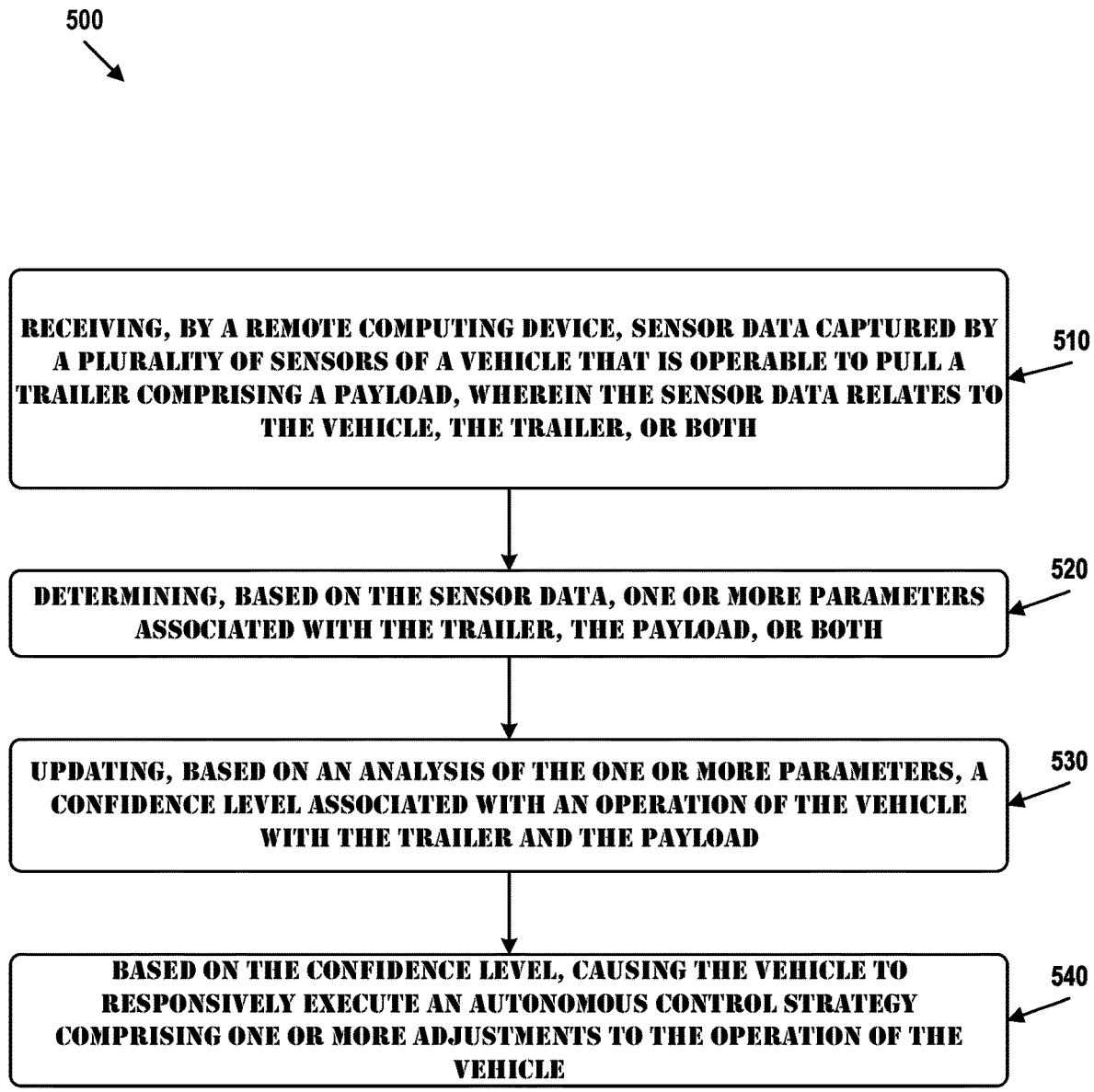
FIG. 5 illustrates a flow chart, in accordance with example embodiments.

FIG. 5 illustrates a flow chart 500, in accordance with example embodiments. The operations may be carried out by processor 113 of vehicle 100, the components thereof, and/or the circuitry associated therewith, among other possibilities. However, the operations can also be carried out by other types of devices or device subsystems. For example, the process could be carried out by a server device, an autonomous vehicle, and/or a robotic device.

The embodiments of FIG. 5 may be simplified by the removal of any one or more of the features shown therein. Further, these embodiments may be combined with features, aspects, and/or implementations of any of the previous figures or otherwise described herein.

Block 510 may involve receiving, by a remote computing device, sensor data captured by a plurality of sensors of a vehicle that is operable to pull a trailer comprising a payload, wherein the sensor data relates to the vehicle, the trailer, or both.

Block 520 may involve determining, based on the sensor data, one or more parameters associated with the trailer, the payload, or both.

Block 530 may involve updating, based on an analysis of the one or more parameters, a confidence level associated with an operation of the vehicle with the trailer and the payload.

Block 540 may involve, based on the confidence level, causing the vehicle to responsively execute an autonomous control strategy comprising one or more adjustments to the operation of the vehicle.

In some embodiments, the confidence level may be updated based on a historical value of a performance limit associated with the trailer. The historical value of the performance limit of the trailer may be retrieved from a repository of historical values of performance limits associated with a plurality of trailers.

Some embodiments may involve determining, by the remote computing device and based on the sensor data, an updated value of the performance limit. Such embodiments may also involve determining whether the updated value of the performance limit is outside an expected range for a value of the performance limit. The autonomous control strategy may be based on the updated value of the performance limit being outside the expected range.

Some embodiments may involve collecting, by the remote computing device, values of performance limits associated with a plurality of trailers. Such embodiments may also involve generating the repository of historical values based on the collected values of performance limits.

Some embodiments may involve determining, at the remote computing device and based on historical values of performance limits associated with a given trailer, an optimal payload for the given trailer. Such embodiments may also involve communicating, to a given vehicle associated with the given trailer, the optimal payload.

In some embodiments, the performance limit of the trailer may include data related to one or more of a braking system for the trailer, a suspension system for the trailer, an anti-braking system for the trailer, and behavior characteristics of the trailer without a payload.

Figure 6:
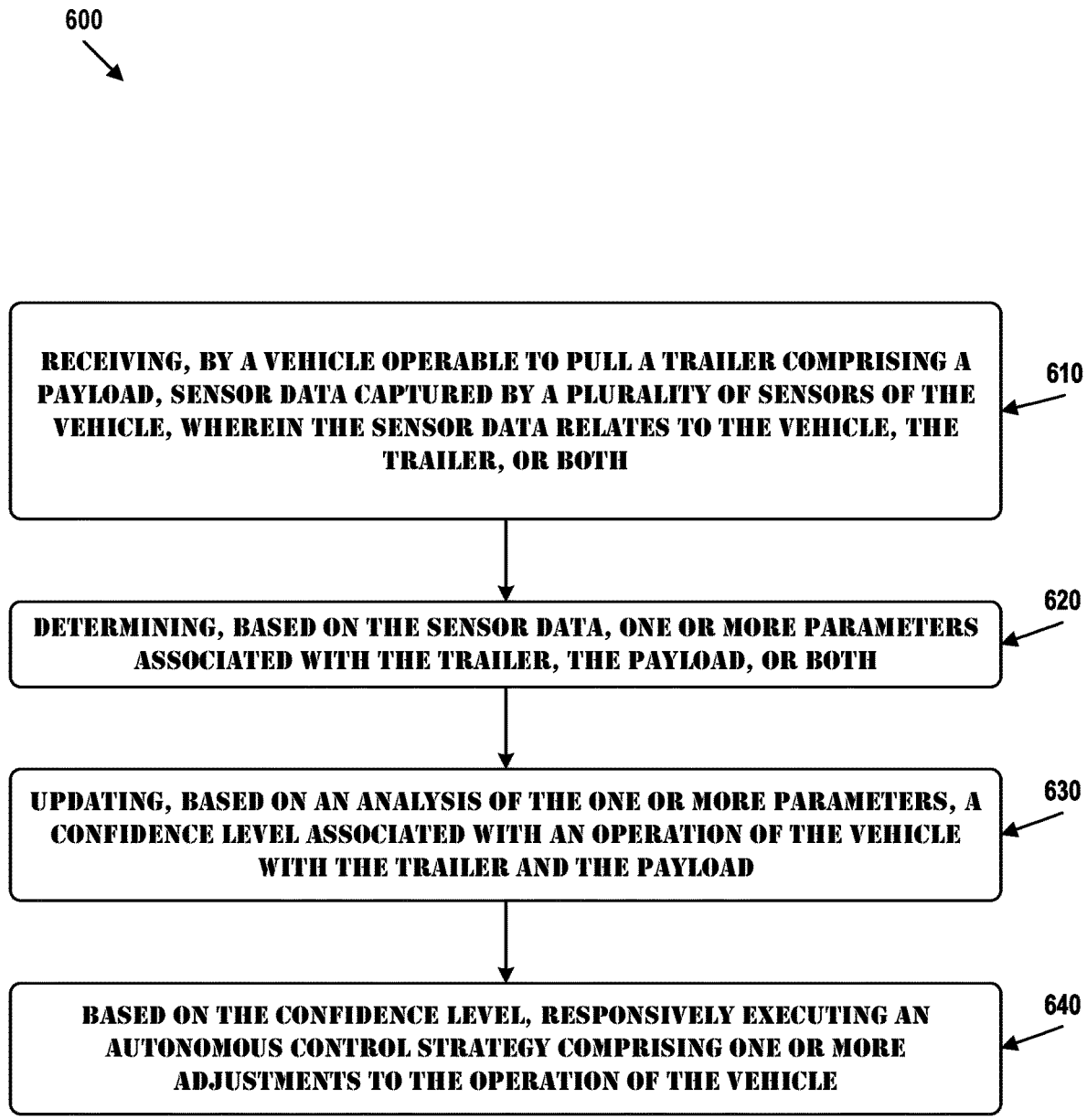
FIG. 6 illustrates another flow chart, in accordance with example embodiments.

FIG. 6 illustrates another flow chart 600, in accordance with example embodiments. The operations may be carried out by processor 408 of computing device 404, the components thereof, and/or the circuitry associated therewith, among other possibilities. However, the operations can also be carried out by other types of devices or device subsystems. For example, the process could be carried out by vehicle 100, 200A, a server device, an autonomous vehicle, and/or a robotic device.

The embodiments of FIG. 6 may be simplified by the removal of any one or more of the features shown therein. Further, these embodiments may be combined with features, aspects, and/or implementations of any of the previous figures or otherwise described herein.

Block 610 may involve receiving, by a vehicle operable to pull a trailer comprising a payload, sensor data captured by a plurality of sensors of the vehicle, wherein the sensor data relates to the vehicle, the trailer, or both.

Block 620 may involve determining, based on the sensor data, one or more parameters associated with the trailer, the payload, or both.

Block 630 may involve updating, based on an analysis of the one or more parameters, a confidence level associated with an operation of the vehicle with the trailer and the payload.

Block 640 may involve, based on the confidence level, responsively executing an autonomous control strategy comprising one or more adjustments to the operation of the vehicle.

V. EXAMPLE COMPUTER READABLE MEDIA

Figure 7:
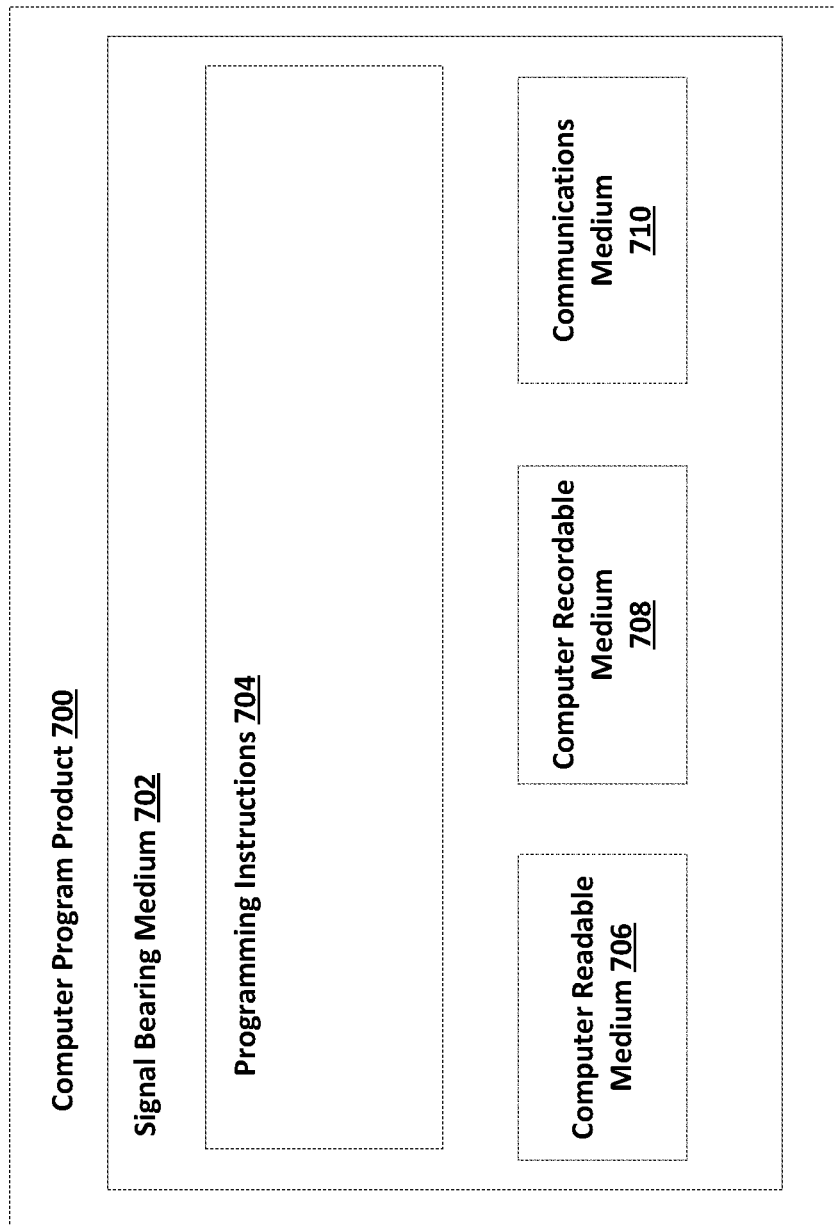
FIG. 7 depicts an example computer readable medium, in accordance with example embodiments.

FIG. 7 depicts an example computer readable medium, in accordance with example embodiments. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., described inflow charts 500, 600, etc.) may be implemented by computer program instructions encoded on a computer readable storage media in a machine-readable format, or on other media or articles of manufacture (e.g., instructions 115 of vehicle 100, instructions 412 of the computing device 404, etc.). FIG. 7 is a schematic illustrating a conceptual partial view of an example computer program product that includes a computer program for executing a computer process on a computing device, such as on a radar planning system, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 702 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remote from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remote computer system, such as a server, or a distributed cloud computing network.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for the purpose of illustration and are not intended to be limiting, with the true scope being indicated by the following claims.

What is claimed is:

1. A vehicle operable to pull a trailer comprising a payload, comprising:
a plurality of sensors configured to capture sensor data related to the vehicle, the trailer, or both; and
a controller configured to: (i) receive, from the plurality of sensors, sensor data relating to one or more maneuvers of the vehicle connected to the trailer, wherein the one or more maneuvers of the vehicle connected to the trailer comprise at least one of an acceleration, a turn operation, or a braking operation, (ii) determine, based on the sensor data relating to the one or more maneuvers of the vehicle connected to the trailer, one or more parameters associated with the payload, wherein the one or more parameters associated with the payload comprise at least a center of gravity of the payload, (iii) update, based on an analysis of the one or more parameters, a confidence level associated with an operation of the vehicle with the trailer and the payload, and (iv) based on the confidence level, responsively execute an autonomous control strategy comprising one or more adjustments to the operation of the vehicle.

2. The vehicle of claim 1, wherein the one or more parameters associated with the payload further comprise at least one of a payload size, payload arrangement on the trailer, or a weight of the payload.

3. The vehicle of claim 1, wherein the updating of the confidence level is based on a historical value of a performance limit associated with the trailer, wherein the historical value of the performance limit of the trailer is retrieved from a repository of historical values of performance limits associated with a plurality of trailers.

4. The vehicle of claim 1, wherein the updating of the confidence level is based on a road characteristic of a portion of a planned route.

5. The vehicle of claim 1, wherein the updating of the confidence level is based on weather data for a portion of a planned route.

6. The vehicle of claim 1, wherein the plurality of sensors comprises one or more of: an inertial measurement unit, a laser measurement unit for trailer articulation, a roll sensor to measure a body roll, a pitch sensor to measure pitch data, or a pressure sensor mounted on a suspension of a tractor, trailer, or both.

7. The vehicle of claim 1, wherein the sensor data relating to the one or more maneuvers of the vehicle connected to the trailer comprises sensor data from a roll sensor of the vehicle, wherein the controller is configured to determine, based on the sensor data from the roll sensor of the vehicle, a lateral component of the center of gravity of the payload.

8. The vehicle of claim 1, wherein the sensor data relating to the one or more maneuvers of the vehicle connected to the trailer comprises sensor data from a roll sensor of the vehicle, wherein the controller is configured to determine, based on the sensor data from the roll sensor of the vehicle, a vertical component of the center of gravity of the payload.

9. The vehicle of claim 1, wherein the sensor data relating to the one or more maneuvers of the vehicle connected to the trailer comprises sensor data from pressure sensors and/or displacement sensors in a suspension of the vehicle, wherein the controller is configured to determine, based on the sensor data from the pressure sensors and/or displacement sensors, a vertical component of the center of gravity of the payload.

10. The vehicle of claim 1, wherein the autonomous control strategy comprises an adjustment to an autonomous navigation strategy for the vehicle.

11. The vehicle of claim 10, wherein the adjustment to the autonomous navigation strategy comprises recommending a speed strategy for the vehicle for a portion of a planned route.

12. The vehicle of claim 10, wherein the adjustment to the autonomous navigation strategy comprises recommending a turn strategy for the vehicle for a portion of a planned route.

13. A method comprising:
receiving, by a remote computing device, sensor data captured by a plurality of sensors of a vehicle that is operable to pull a trailer comprising a payload, the sensor data captured by the plurality of sensors comprising sensor data relating to one or more maneuvers of the vehicle connected to the trailer, wherein the one or more maneuvers of the vehicle connected to the trailer comprise at least one of an acceleration, a turn operation, or a braking operation;
determining, based on the sensor data relating to one or more maneuvers of the vehicle connected to the trailer, one or more parameters associated with the payload, wherein the one or more parameters associated with the payload comprise at least a center of gravity of the payload;
updating, based on an analysis of the one or more parameters, a confidence level associated with an operation of the vehicle with the trailer and the payload; and
based on the confidence level, causing the vehicle to responsively execute an autonomous control strategy comprising one or more adjustments to the operation of the vehicle.

14. The method of claim 13, wherein the updating of the confidence level is based on a historical value of a performance limit associated with the trailer, wherein the historical value of the performance limit of the trailer is retrieved from a repository of historical values of performance limits associated with a plurality of trailers.

15. The method of claim 14, further comprising:
determining, by the remote computing device and based on the sensor data captured by the plurality of sensors, an updated value of the performance limit;
determining whether the updated value of the performance limit is outside an expected range for a value of the performance limit, and
wherein the autonomous control strategy is based on the updated value of the performance limit being outside the expected range.

16. The method of claim 14, further comprising:
collecting, by the remote computing device, values of performance limits associated with the plurality of trailers; and
generating the repository of historical values based on the collected values of performance limits.

17. The method of claim 14, further comprising:
determining, at the remote computing device and based on historical values of performance limits associated with a given trailer, an optimal payload for the given trailer; and
communicating, to a given vehicle associated with the given trailer, the optimal payload.

18. The method of claim 14, wherein the performance limit of the trailer comprises data related to one or more of a braking system for the trailer, a suspension system for the trailer, an anti-braking system for the trailer, and behavior characteristics of the trailer without a payload.

19. A method comprising:
receiving, by a vehicle operable to pull a trailer comprising a payload, sensor data captured by a plurality of sensors of the vehicle, the sensor data captured by the plurality of sensors comprising sensor data relating to one or more maneuvers of the vehicle connected to the trailer, wherein the one or more maneuvers of the vehicle connected to the trailer comprise at least one of an acceleration, a turn operation, or a braking operation;
determining, based on the sensor data relating to one or more maneuvers of the vehicle connected to the trailer, one or more parameters associated with the payload, wherein the one or more parameters associated with the payload comprise at least a center of gravity of the payload;
updating, based on an analysis of the one or more parameters, a confidence level associated with an operation of the vehicle with the trailer and the payload; and
based on the confidence level, responsively executing an autonomous control strategy comprising one or more adjustments to the operation of the vehicle.

* * * * *